(12) United States Patent  
Bessette et al.

(10) Patent No.: US 8,312,945 B2
(45) Date of Patent: Nov. 20, 2012

(54) DISPLACEMENT LIMITING ASSEMBLY FOR A TRACK SYSTEM

(75) Inventors: Robert Bessette, St-Charles de Drummond (CA); Louis-Frédéric Marchildon, St-Charles de Drummond (CA)

(73) Assignee: Soucy International Inc., Drummondville (CA)

( * ) Notice: Subject to any disclaimer, the term of this patent is extended or adjusted under 35 U.S.C. 154(b) by 397 days.

(21) Appl. No.: 12/551,227

(22) Filed: Aug. 31, 2009

(65) Prior Publication Data

US 2011/0048816 A1 Mar. 3, 2011

(51) Int. Cl.
*B62M 29/00* (2006.01)
(52) U.S. Cl. ........................ 180/9.54; 180/190
(58) Field of Classification Search ............... 180/9.54, 180/190; 305/127, 128
See application file for complete search history.

(56) References Cited

U.S. PATENT DOCUMENTS

| | | | | | |
|---|---|---|---|---|---|
| 5,947,217 | A | * | 9/1999 | Snare et al. | 180/9.56 |
| 8,056,655 | B2 | * | 11/2011 | Mallette et al. | 180/9.21 |
| 2003/0159868 | A1 | * | 8/2003 | Alexander | 180/190 |
| 2004/0007914 | A1 | * | 1/2004 | Lemieux | 305/127 |
| 2004/0262064 | A1 | * | 12/2004 | Lefort | 180/190 |
| 2005/0205322 | A1 | * | 9/2005 | Girouard et al. | 180/190 |
| 2006/0185919 | A1 | * | 8/2006 | Hibbert et al. | 180/190 |
| 2006/0254841 | A1 | * | 11/2006 | Strong | 180/190 |
| 2007/0169968 | A1 | * | 7/2007 | Todd et al. | 180/9.1 |
| 2007/0199753 | A1 | * | 8/2007 | Giese et al. | 180/190 |
| 2007/0290553 | A1 | * | 12/2007 | Christianson | 305/134 |
| 2009/0050379 | A1 | * | 2/2009 | Albright et al. | 180/9.54 |

* cited by examiner

*Primary Examiner* — Tashiana Adams
(74) *Attorney, Agent, or Firm* — Brouillette & Partners; François Cartier; Robert Brouillette (57) ABSTRACT

An assembly is provided for limiting the displacement of a track system mounted to the axle of a vehicle. The assembly generally comprises an anchor bracket and a stabilizing rod. The anchor bracket is configured to be fixedly mounted to the chassis of the vehicle whereas the stabilizing rod is pivotally and slidingly mounted, at one end, to the anchor bracket, and generally only pivotally mounted, at the other end, to the track system. While allowing limited rotation, the limiting assembly generally prevents excessive rotation of the track system about the axle.

14 Claims, 7 Drawing Sheets

DISPLACEMENT LIMITING ASSEMBLY FOR A TRACK SYSTEM

CROSS-REFERENCE TO RELATED APPLICATIONS

There are no cross-related applications.

FIELD OF THE INVENTION

The present invention generally relates to the field of traction assemblies and track systems used as wheel substitutes on wheeled vehicles.

BACKGROUND OF THE INVENTION

Track systems for use as wheel replacement on typically wheeled vehicles are known in the art. Indeed, several configurations of track systems have been proposed throughout the years in order to generally improve different aspects and characteristics such as the riding behaviour. In addition, track systems have been used on different types of wheeled vehicles such, but not limited to, all-terrain vehicles (ATV), farming equipments such as tractors, snow grooming equipments, etc.

Though track systems generally improve several characteristics of the vehicles such as traction and floatation, particularly over soft terrain, it remains that track systems are typically retrofitted on existing vehicles which were initially designed to support wheels.

Hence, it is generally necessary to provide the vehicles to which the track systems are installed with movement and/or displacement limiting elements in order to prevent interferences between the track systems and the other components of the vehicles. These displacement limiting elements are however generally custom and complex in nature.

Hence, despite ongoing developments in the field of track systems, there is still room for further improvements.

SUMMARY OF THE INVENTION

The principles of the present invention are generally embodied in a displacement limiting assembly which allows small rotational movements of a track system about an axle but which prevent large rotational movements of the track system about the axle.

The displacement limiting assembly of the present invention generally comprises means such as an anchor bracket configured to be fixedly mounted to the chassis of the vehicle to which the track system is mounted. The displacement limiting assembly also comprises a stabilizing rod mounted to and extending between the anchor bracket and the track system.

In accordance with the invention, the stabilizing rod is pivotally and slidingly coupled to the anchor bracket and pivotally coupled to the track system. The pivotal coupling of the stabilizing rod to both the anchor bracket and the track system allows the stabilizing rod to follow the vertical movements of the track system. For its part, the sliding coupling of the stabilizing rod with the anchor bracket, which allows for limited longitudinal or back and forth movements due to the presence of resilient stopper elements, allows rotational movements of small amplitude of the track system about the axle but prevent rotational movements of large amplitude of the track system which could cause damages to the vehicle.

In accordance with the present invention, due to its particular configuration, the displacement limiting assembly also generally maintains the contact patch of the traction band of the track system substantially parallel to the ground over which the vehicle is operated, and that, substantially independently of the position (e.g. extended, normal or retracted) of the suspension of the vehicle.

The displacement limiting assembly of the present invention is particularly useful when used on all-terrain vehicles ("ATV").

The features of the present invention which are believed to be novel are set forth with particularity in the appended claims.

BRIEF DESCRIPTION OF THE DRAWINGS

The above and other objects, features and advantages of the invention will become more readily apparent from the following description, reference being made to the accompanying drawings in which.

DETAILED DESCRIPTION OF THE PREFERRED EMBODIMENT

A novel displacement limiting assembly for a track system will be described hereinafter. Although the invention is described in terms of specific illustrative embodiments, it is to be understood that the embodiments described herein are by way of example only and that the scope of the invention is not intended to be limited thereby.

In accordance with the present invention, the displacement limiting assembly (hereinafter referred to as "limiting assembly") is used in cooperation with a track system mounted preferably to a rear axle of a normally wheeled vehicle such as an ATV. Broadly, the limiting assembly prevents overly large rotational movements of the track system, while allowing small rotational movements, and maintains the contact patch of the traction band substantially parallel to the ground independently of the position of the suspension.

Figure 1:
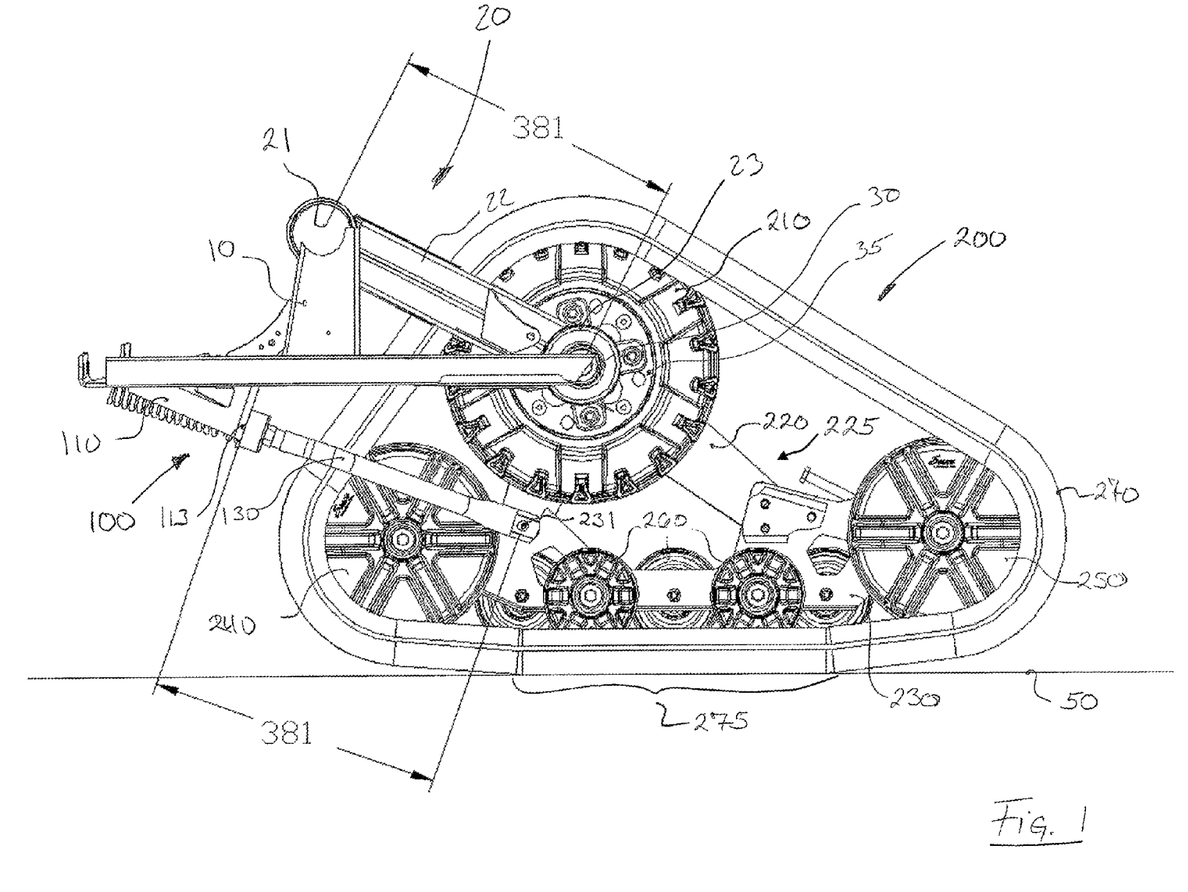
FIG. 1 is a side view of a track system equipped with an exemplary displacement limiting assembly incorporating the principles of the invention; the suspension of the ATV being normal position.
Figure 2:
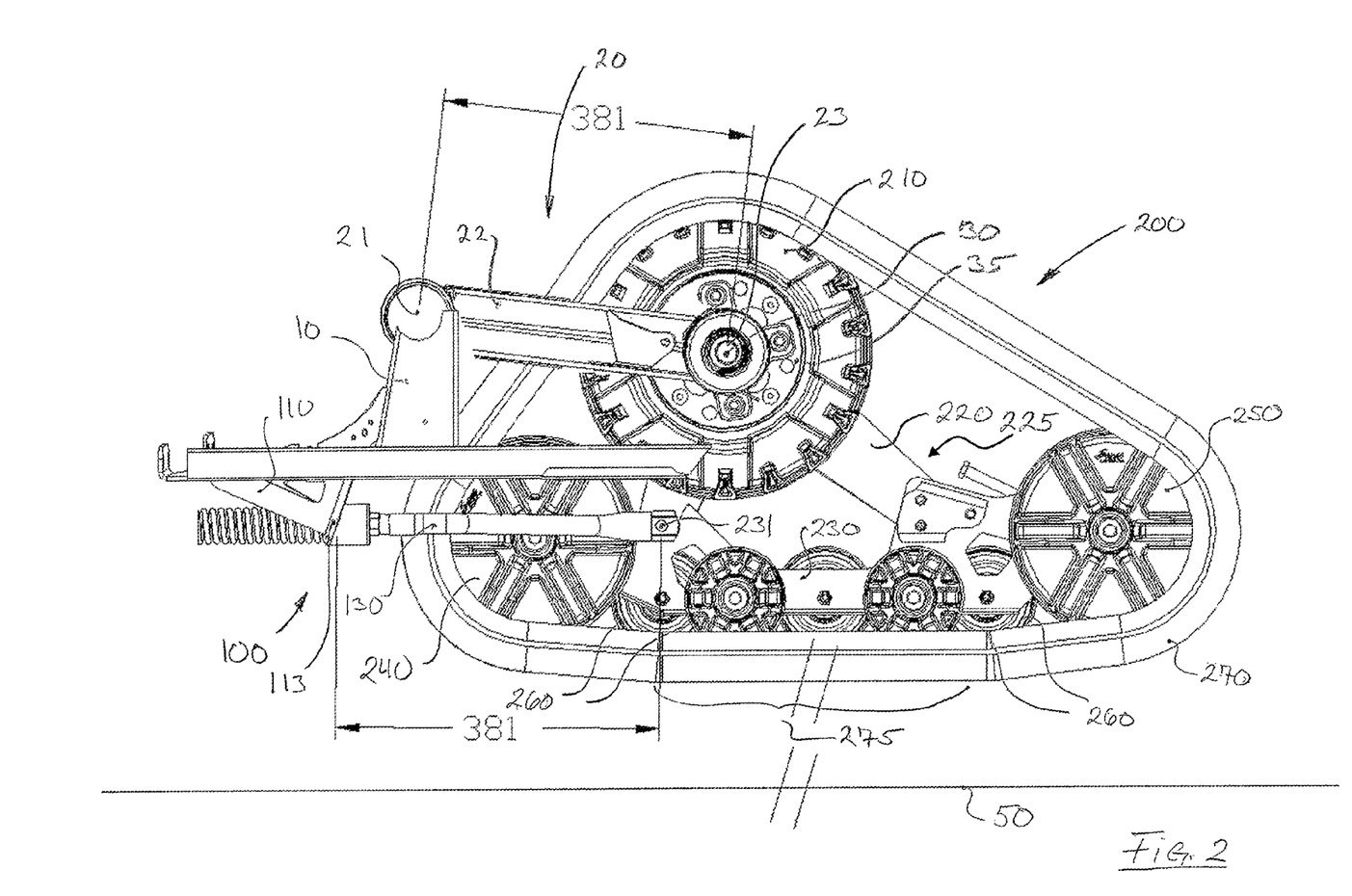
FIG. 2 is a side view of the track system and displacement limiting assembly of FIG. 1; the suspension of the ATV being in retracted position.

Hence, referring first to FIGS. 1 and 2, a displacement limiting assembly 100 for a track system 200 embodying the principles of the invention is shown. The track system 200 is relatively conventional and comprises a sprocket wheel 210, a frame assembly 225 comprising a frame 220 and a guide rail 230, idler wheels 240 and 250 respectively mounted that the fore and at the aft of the guide rail 230, and road wheels 260 mounted along the length of the guide rail 230, typically on each side thereof. The track system 200 further comprises a longitudinally extending elastomeric traction band 270 disposed around and cooperating with the sprocket wheel 210, the idler wheels 240 and 250, the road wheels 260.

The track system 200 is generally mounted to the vehicle (not shown) via the axle 30 and wheel hub 35. The axle 30 is typically drivingly engaged by a motor (not shown) via a transmission (not shown). Also, in order to allow some degree of liberty, the axle 30 is also coupled to the vehicle via suspension 20. The suspension 20 typically comprises a suspension arm 22 pivotally mounted to the chassis 10 of the vehicle at 21 and pivotally coupled to the axle at 23. The suspension 20 allows the axle 30 and the wheel hub 35 to move substantially vertically (see FIGS. 1 and 2).

For its part, the limiting assembly 100 is mounted between the chassis 10 of the vehicle and the frame assembly 225 (e.g. frame 220 or guide rail 230) of the track system 200. The limiting assembly 100 generally comprises means such as an anchor bracket 110, secured to the chassis 10 of the vehicle, and a stabilizing rod 130 pivotally mounted to the anchor bracket 110 and to the frame 220 or guide rail 230. The limiting assembly 100 will be described in more details below.

Still referring to FIGS. 1 and 2, as the skilled addressee will understand, the limiting assembly 100 allows the track system 200 to move vertically when the suspension is retracted (see FIG. 2). However, the limiting assembly 100 also prevents excessive rotation of the track system 200 about the axle 30, thereby preventing the track system 200 from contacting and ultimately damaging other components of the vehicle. It is to be understood that a track system such as track system 200 is much larger than the wheel it replaces. Moreover, a track system such as track system 200 generally has a triangular configuration whereas a wheel has a circular configuration.

In addition, by preventing the track system 200 to rotate excessively about the axle 30, the limiting assembly 100 further maintains the contact area or contact patch 275 of the traction band 270 generally parallel to the ground 50 over which the vehicle is operated. By keeping the contact patch 275 parallel to the ground 50, the traction provided by the track system 200 will remain relatively constant even on uneven terrain.

Referring now to FIGS. 3 to 7, the limiting assembly 100 will be more thoroughly described.

As already mentioned, the limiting assembly 100 comprises means such as an anchor bracket 110, configured to be securely mounted to the chassis 10 of the vehicle, and a stabilizing rod 130 mounted to (at point 113) and extending between the anchor bracket 110 and the frame assembly 225 (at point 231) of the track system 200. The skilled addressee will note that the anchor bracket 110 could possibly be unitary with the chassis 10 of the vehicle.

The skilled addressee will note, from FIGS. 1 and 2, that the portion of the stabilizing rod 130 extending between point 113 and 231 is substantially equal in length to the suspension arm 22. Moreover, the distance between attachment points 113 and 21 and between attachment points 231 and 23 is typically constant. Hence, the limiting assembly 100 generally forms a trapeze or a parallelogram with the suspension 20 of the vehicle.

Figure 3:
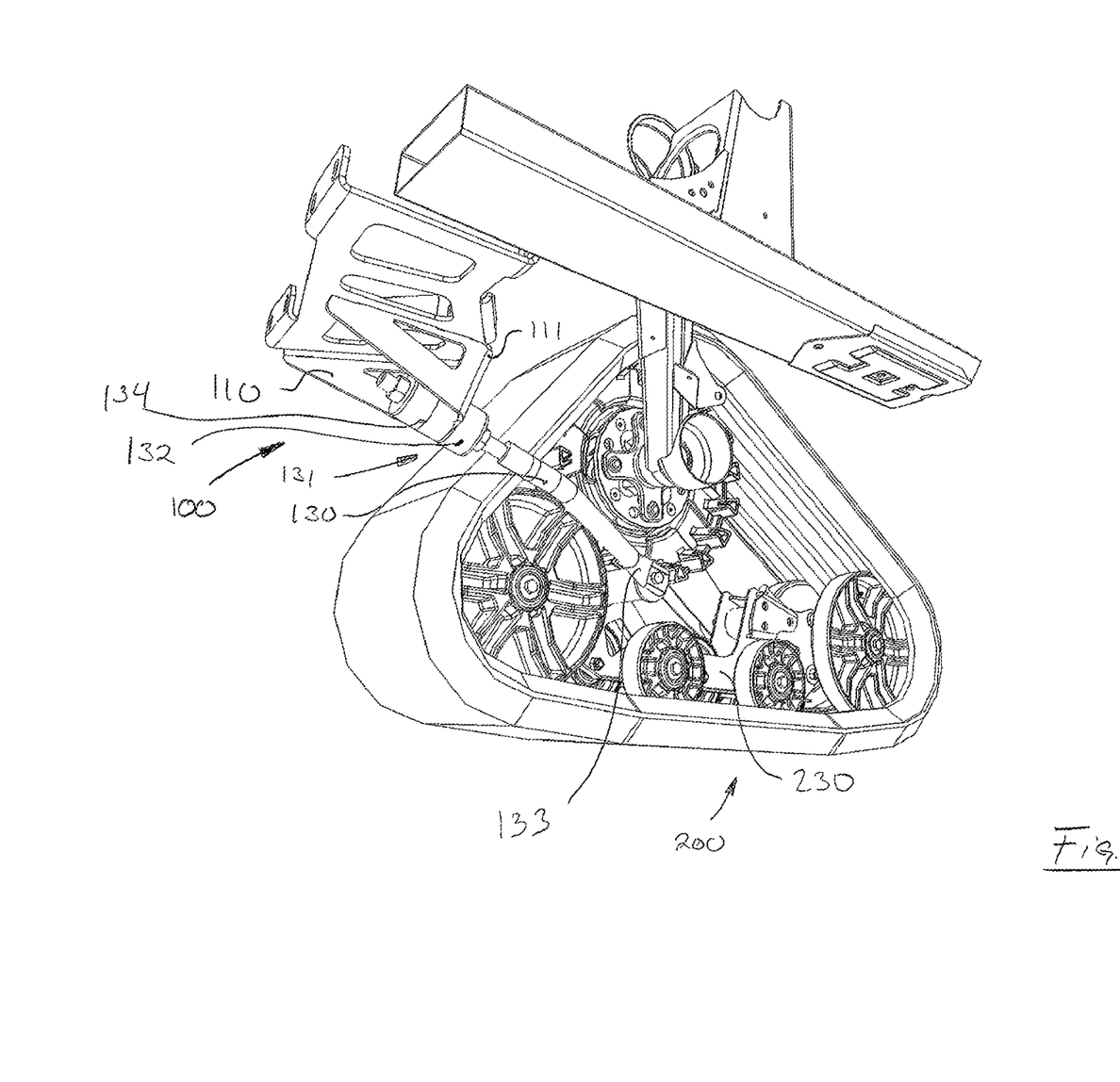
FIG. 3 is an inside perspective view of a track system equipped with another exemplary displacement limiting assembly incorporating the principles of the invention.
Figure 4:
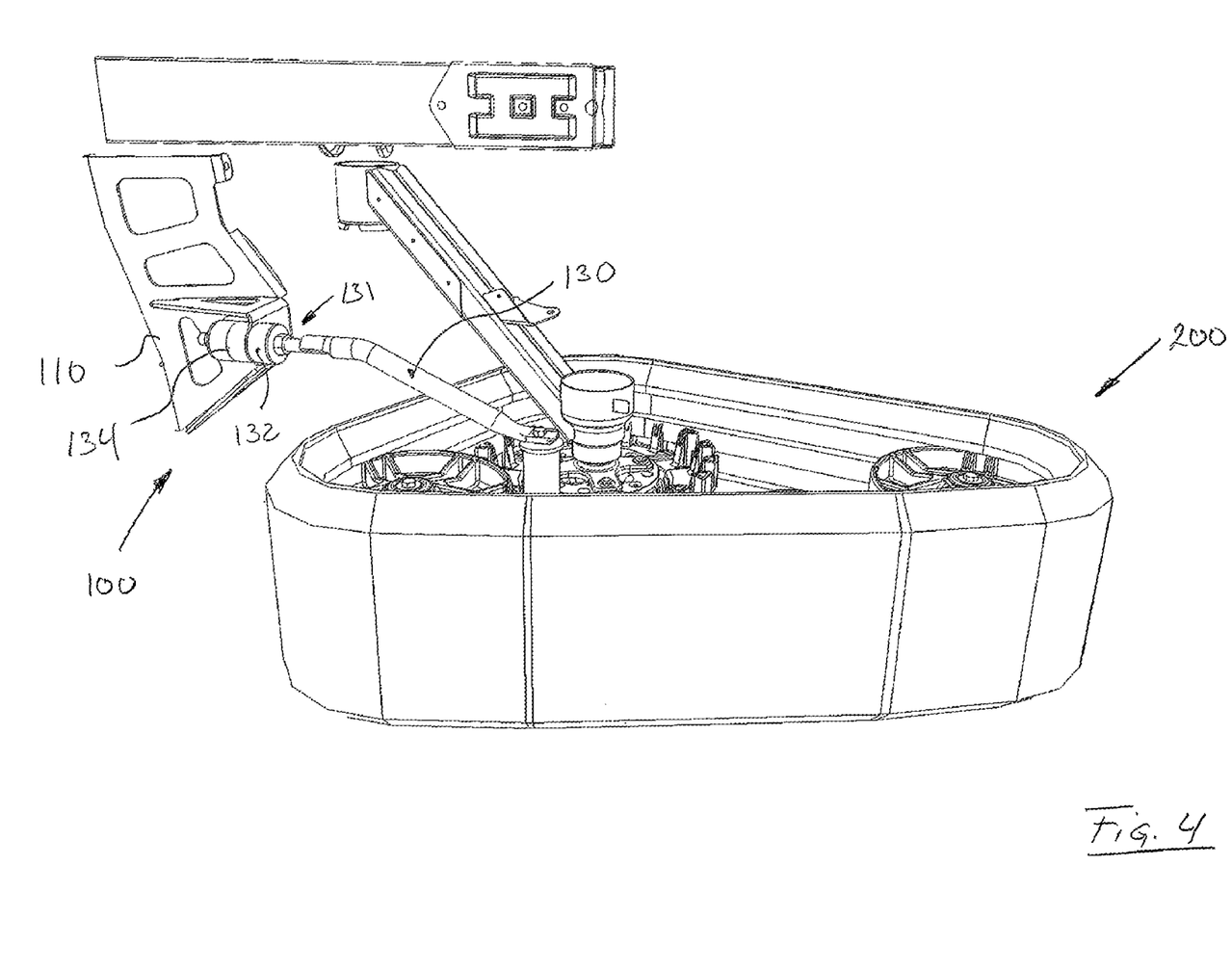
FIG. 4 is a bottom perspective view of the track system and displacement limiting assembly of FIG. 3.
Figure 5:
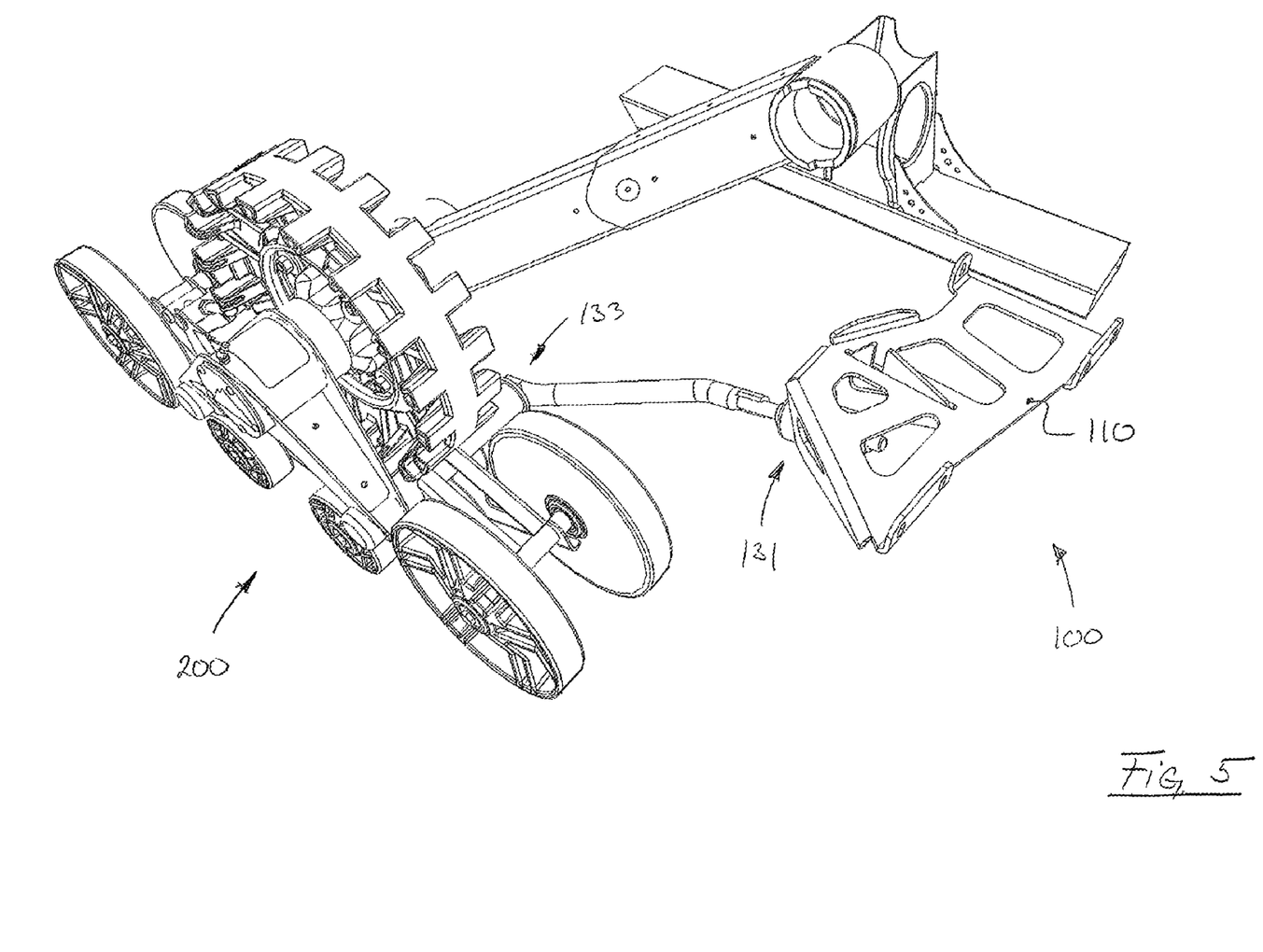
FIG. 5 is an upper perspective view of the track system and displacement limiting assembly of FIG. 3, without the traction band.
Figure 6:
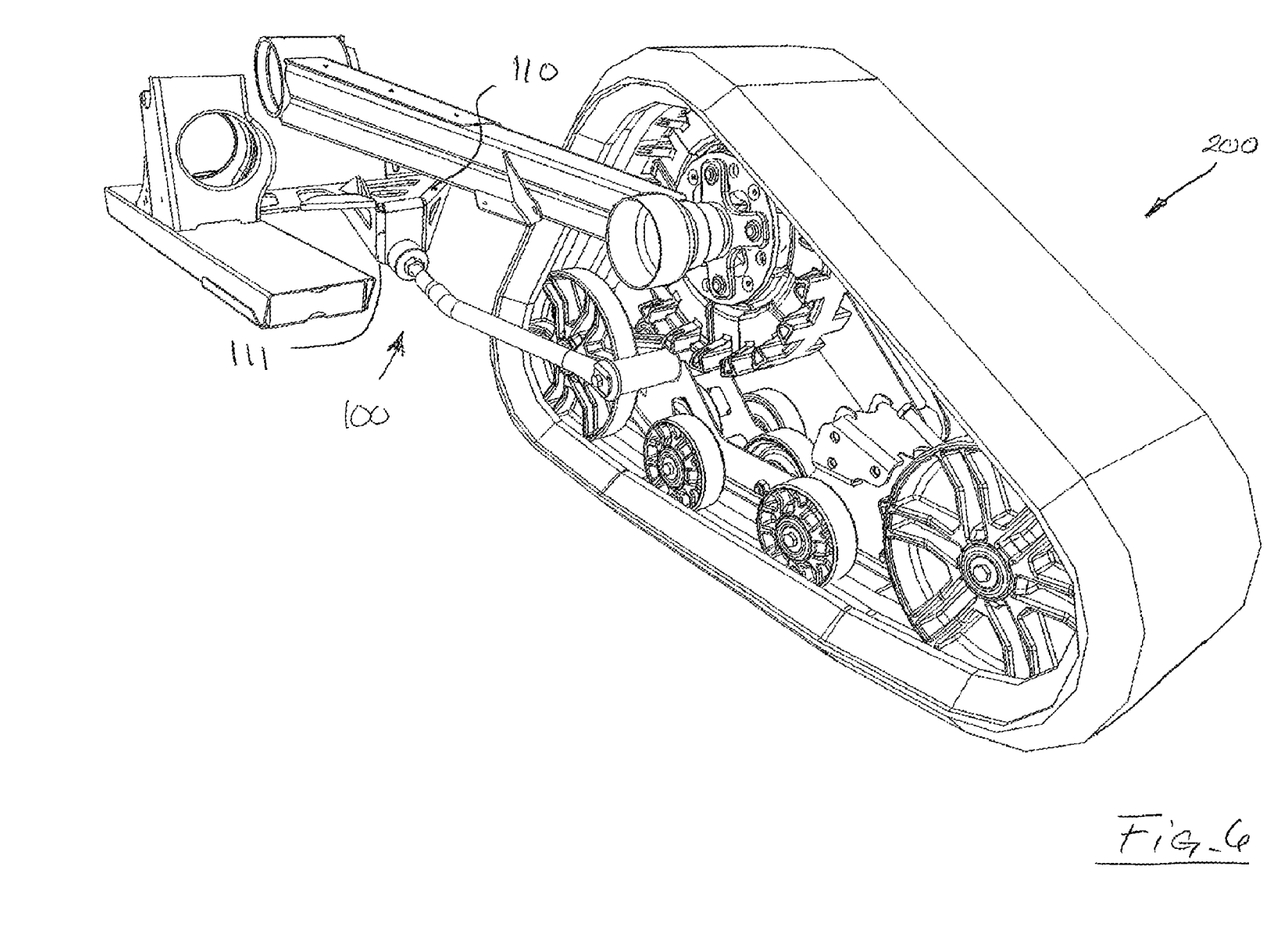
FIG. 6 is another inside perspective view of the track system and displacement limiting assembly of FIG. 3; the suspension of the ATV being in retracted position.
Figure 7:
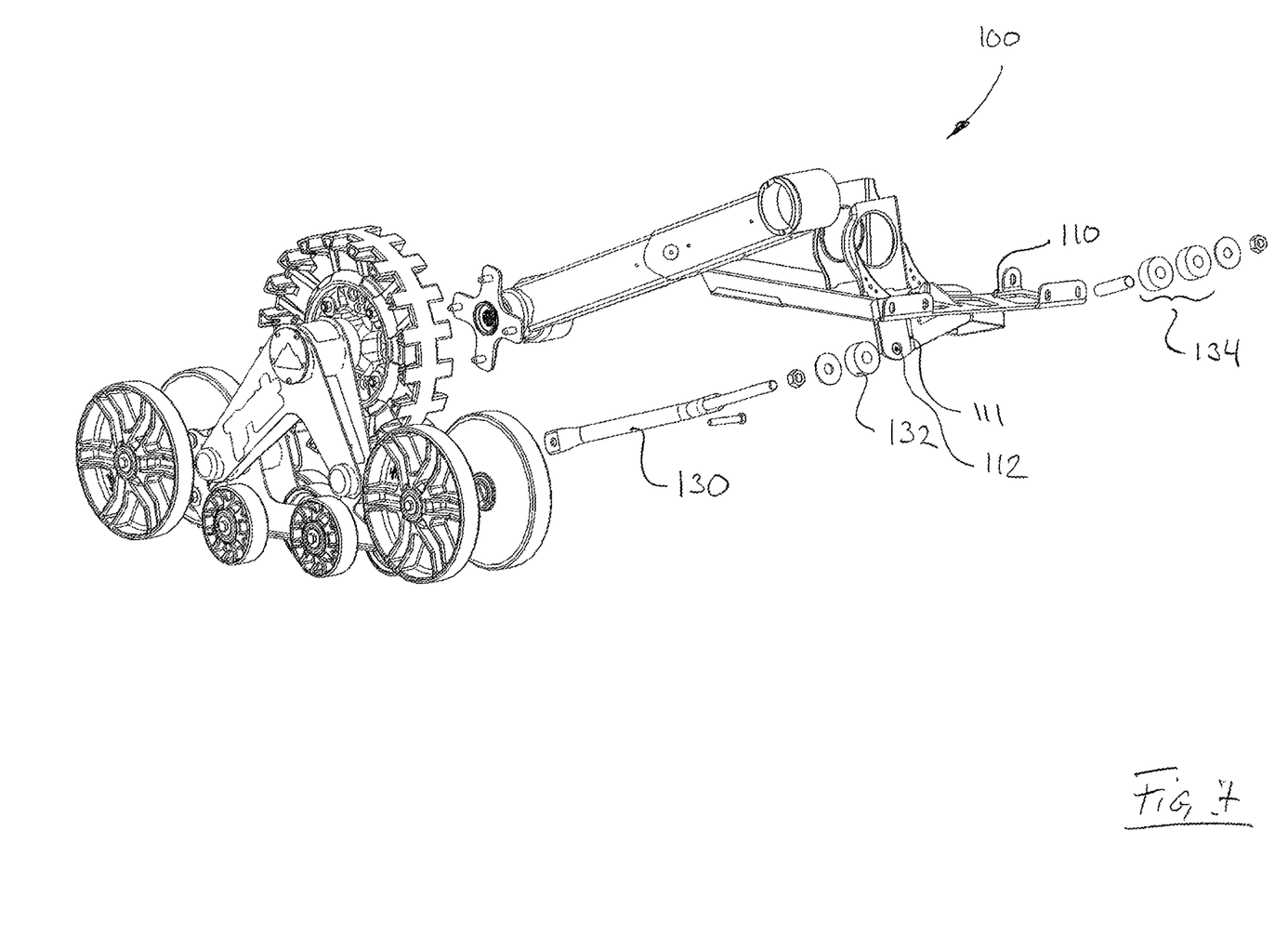
FIG. 7 is a perspective exploded view of the track system and displacement limiting assembly of FIG. 3.

Referring to FIG. 3, the first end 131 of the rod 130 is pivotally and slidingly mounted to the anchor bracket 110 whereas the second end 133 is generally only pivotally mounted to the track system 200. In the present exemplary embodiment, the end 133 of the stabilizing rod 130 is mounted to the guide rail 230 of the track system 200

Referring more particularly to FIG. 3, to receive the first end 131 of the rod 130, the anchor bracket 110 is provided with a downwardly extending connecting portion 111 having an aperture 112 through which extends the first end 131 of the stabilizing rod 130. To slidingly couple the first end 131 to the connecting portion 111, the former is provided with resilient or absorbing elements 132 and 134 typically embodied as springs (see FIGS. 1 and 2) and/or elastomeric bushings (see FIGS. 3 to 7). These elements 132 and 134 are typically fixedly mounted to the first end 131, one on a first side of connecting portion 111, the other on the other side of connecting portion 111.

This arrangement allows the first end 131 of the rod 130 to pivot about the connecting portion 111 (see FIGS. 1 and 2) but also to slightly move back and forth, or longitudinally, within the aperture 112. Understandably, the amplitude of this back and forth movement is limited by the compressibility of the resilient elements 132 and 134. The ability of the first end 131 to slide within the aperture 112 allows the track system 200 to slightly pivot about the axle 30. This would allow the track system 200 to follow the shape of the terrain over which the vehicle is operated.

Hence, referring back to FIGS. 1 and 2, when the vehicle is operated over uneven terrain, the track system 200 will move vertically in tandem with the suspension 20 of the vehicle. However, as the track system 200 moves up and down, the stabilizing rod 130 of the limiting assembly 100 prevents the track system 200 to overly rotate about the axle 30 of the vehicle. However, as the first end 131 of the rod 130 can slightly move back and forth within the aperture 112 of the connecting portion 111, the track system 200 can still slightly rotate, albeit in a limited fashion, about the axle 30, allowing the track system 200 to absorb smaller bumps in the ground 50.

Still, because the resilient elements 132 and 134 prevent excessive back and forth movements within the aperture 112, the stabilizing rod 130 will generally remain in its normal or resting position (see FIGS. 1 and 2). Consequently, due to the generally trapezoidal configuration of the limiting assembly 100, the stabilizing rod 130 will maintain the contact patch 275 of the traction band 270 substantially parallel to the ground 50, and that, substantially independently of the position of the suspension 20.

The skilled addressee will readily understand that the limiting assembly 100 of the present invention provides significant advantages. Firstly, the limiting assembly 100 prevents unwanted and excessive rotation of the track system 200 about the axle 30, thereby preventing damages to the vehicle. Secondly, due to its generally trapezoidal configuration, the limiting assembly 100 generally maintains the contact patch 275 of the traction band 270 substantially parallel to the ground 50 over which the vehicle in operated. Finally, through the sliding coupling of the first end 131 and the connecting portion 111, the limiting assembly 100 still allows for limited rotation of the track system 200 about the axle 30, thereby allowing the track system 200 to better follow the ground 50 and thereby providing a smoother ride of the operator of the vehicle.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A displacement limiting assembly for use with a track system mounted to an axle of a vehicle, the track system comprising a sprocket wheel coupled to the axle, a frame assembly mounted to the sprocket wheel, wheels mounted to the frame assembly, and a traction band disposed about the sprocket wheel and the wheels, the traction band defining a ground contacting area with a ground surface, the vehicle comprising a frame, at least one suspension arm pivotally connected to the frame and coupled to the axle, the at least one suspension arm being displaceable between an extended position, a normal position and a retracted position, the displacement limiting assembly comprising an anchor bracket configured to be fixedly mounted to the frame of the vehicle, and a stabilizing member comprising a first end pivotally mounted to the anchor bracket at a location distinct from the suspension arm whereby the location does not directly follow the displacements of the suspension arm, and a second end configured to be pivotally mounted to the frame assembly of the track system, whereby the stabilizing member maintains the ground contacting area of the traction band substantially parallel to the ground surface when the suspension arm moves between the extended, normal and retracted positions.

2. A displacement limiting assembly as claimed in claim 1, wherein the anchor bracket comprises an aperture, wherein the first end of the stabilizing member extends through the aperture, and wherein the first end is further slidingly mounted to the anchor bracket.

3. A displacement limiting assembly as claimed in claim 2, wherein the stabilizing member comprises a first resilient element mounted to the first end on a first side of the aperture, and a second resilient element mounted to the first end on a second side of the aperture, whereby the first and second resilient elements limit the sliding movements of the first end of the stabilizing member with respect to the aperture.

4. A displacement limiting assembly as claimed in claim 3, wherein at least one of the first and second resilient elements is an elastomeric bushing.

5. A displacement limiting assembly as claimed in claim 3, wherein at least one of the first and second resilient elements is a spring.

6. A displacement limiting assembly as claimed in claim 1, wherein the axle is the rear axle of the vehicle.

7. A displacement limiting assembly for use with a track system mounted to an axle of a vehicle, the track system comprising a sprocket wheel coupled to the axle, a frame assembly mounted to the sprocket wheel, wheels mounted to the frame assembly, and a traction band disposed about the sprocket wheel and the wheels, the traction band defining a ground contacting area with a ground surface, the vehicle comprising a frame, at least one suspension arm pivotally connected to the frame and coupled to the axle, the at least one suspension arm being displaceable between an extended position, a normal position and a retracted position, the displacement limiting assembly comprising a stabilizing member comprising a first end configured to be pivotally mounted to the frame of the vehicle at a location distinct from the suspension arm whereby the location does not directly follow the displacements of the suspension arm, and a second end configured to be pivotally mounted to the frame assembly of the track system, whereby the stabilizing member maintains the ground contacting area of the traction band substantially parallel to the ground surface when the suspension arm moves between the extended, normal and retracted positions.

8. A displacement limiting assembly as claimed in claim 7, wherein the first end of the stabilizing member is configured to be pivotally mounted to an anchor bracket configured to extend from the frame of the vehicle and being integral with the frame of the vehicle.

9. A displacement limiting assembly as claimed in claim 8, wherein the anchor bracket comprises an aperture, wherein the first end of the stabilizing member extends through the aperture, and wherein the first end is further slidingly mounted to the anchor bracket.

10. A displacement limiting assembly as claimed in claim 9, wherein the stabilizing member comprises a first resilient element mounted to the first end on a first side of the aperture, and a second resilient element mounted to the first end on a second side of the aperture, whereby the first and second resilient elements limit the sliding movements of the first end of the stabilizing member with respect to the aperture.

11. A displacement limiting assembly as claimed in claim 10, wherein at least one of the first and second resilient elements is an elastomeric bushing.

12. A displacement limiting assembly as claimed in claim 10, wherein at least one of the first and second resilient elements is a spring.

13. A displacement limiting assembly as claimed in claim 7, wherein the axle is the rear axle of the vehicle.

14. A vehicle comprising a frame, a rear axle, and at least one suspension arm pivotally connected to the frame and coupled to the rear axle, the at least one suspension arm being displaceable between an extended position, a normal position and a retracted position, the vehicle having mounted thereto a track system comprising a sprocket wheel coupled to the rear axle, a frame assembly mounted to the sprocket wheel, wheels mounted to the frame assembly, and a traction band disposed about the sprocket wheel and the wheels, the traction band defining a ground contacting area with a ground surface, the vehicle comprising a stabilizing member comprising a first end pivotally mounted to the frame of the vehicle at a location distinct from the suspension arm whereby the location does not directly follow the displacements of the suspension arm, and a second end pivotally mounted to the frame assembly of the track system, the stabilizing member maintaining the ground contacting area of the traction band substantially parallel to the ground surface when the suspension arm moves between the extended, normal and retracted positions.

* * * * *